Jan. 1, 1952
R. C. READ ET AL
2,581,294
JUICE EXTRACTOR
Filed Nov. 6, 1947
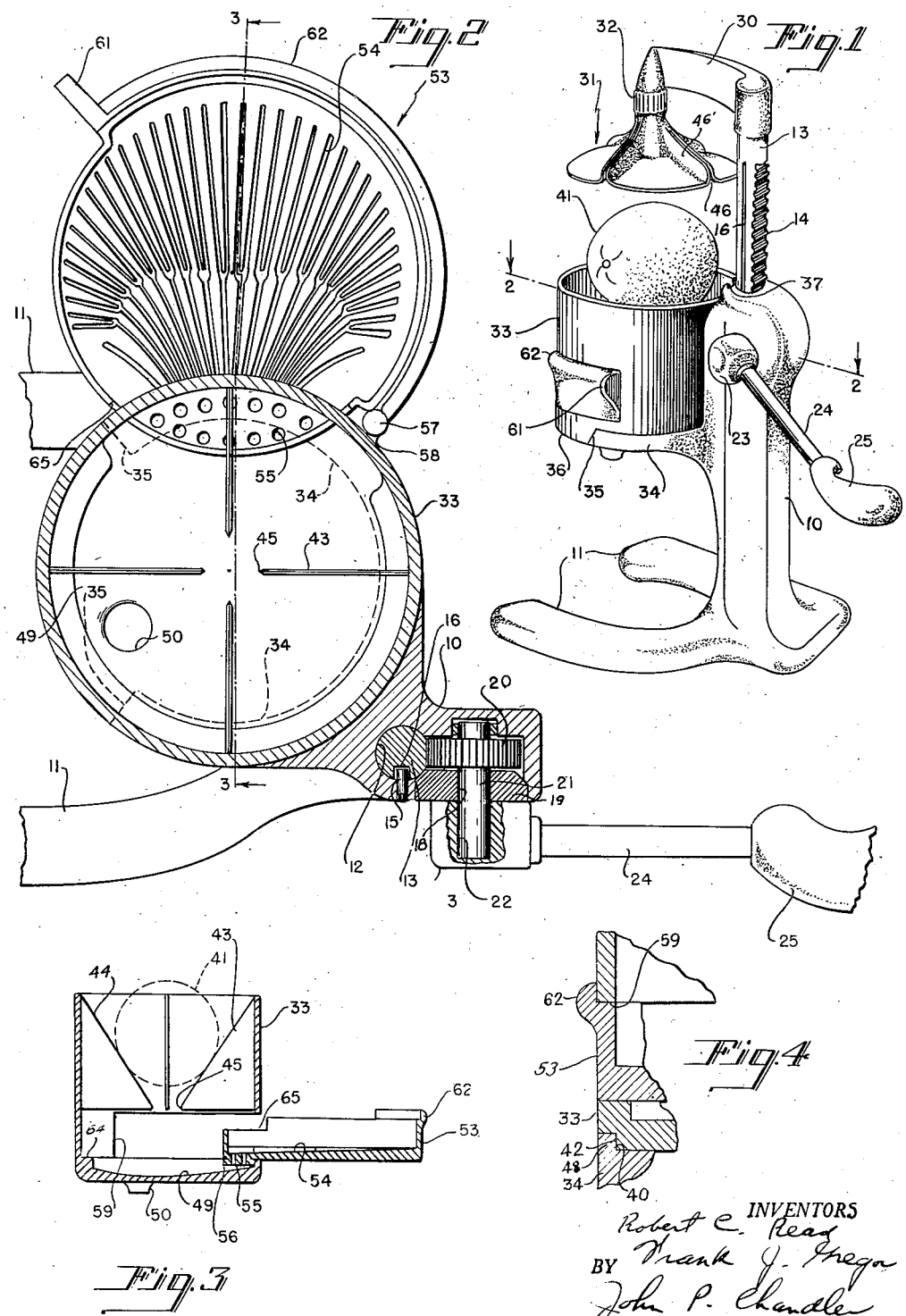
INVENTORS
Robert C. Read
Frank J. Gregor
BY John P. Chandler
their Attorney Patented Jan. 1, 1952

2,581,294

UNITED STATES PATENT OFFICE 2,581,294

JUICE EXTRACTOR

Robert C. Read, Weston, and Frank J. Gregor, Wilton, Conn.

Application November 6, 1947, Serial No. 784,404

3 Claims. (Cl. 100—42)

This invention relates to fruit juicers designed primarily for the extraction of juice from citrus fruits, and has for its principal object the provision of a novel apparatus for use in the home, restaurant or bar which quickly extracts a maximum amount of the juice from the whole, uncut fruit. Since the fruit is cut by the juicer in the same operation as the juice extraction, there is a distinct saving of time and elimination of bother.

Another object of the invention is to provide an improved juice extractor which retains the seeds and a major portion of the pulp within the squeezed carcass, which provides means for quick removal of the carcass, and which is easily cleaned after the juicing operation.

The juicer of the present invention has a particularly novel arrangement of cutting knives which perform their cutting function in an area spaced from the juice-expressing area. The whole fruit is thus cut in the first portion of the cycle, then moved to the expressing zone, and the carcass then positioned for easy removal. The knives are so arranged as to center the fruit within the squeezing bowl, regardless of the size and shape of the fruit.

A further object of the invention is to provide a device of this general character which is arranged to perform an equally efficient operation with citrus fruit of different kinds and of varying diameters.

Yet another object of the invention is to provide a juicer of adequate size for all manual juicing operations, but which is compact and presents no high extensions when not in use. In its commercial form it is arranged to be placed under the standard kitchen cabinet which is placed fourteen inches above the counter.

A further object of the invention is to provide a novel tray arrangement wherein the tray is readily swung out of the bowl for removal of the flattened carcass and is completely detachable from the bowl for cleaning. In one form of the invention the tray is arranged to be swung out manually, and in another form it is done automatically as the presser head is manipulated.

The embodiment of the invention chosen for illustration in the drawing is arranged for manual operation, but it will be appreciated that it may be embodied in a continuous, power-driven machine for commercial cannery operations.

In the drawings:

Fig. 1 is a perspective view of a juice extractor embodying the present invention, and showing the tray member in closed position.

Fig. 2 is a broken, horizontal section taken on line 2—2 of Fig. 1, but showing the tray member in open position.

Fig. 3 is a vertical section taken on line 3—3 of Fig. 2.

Fig. 4 is a broken vertical section taken through the bowl, the tray, and the support for the bowl.

The juicer of the present invention includes an upright frame 10 which may be cast, if desired, and is provided with a substantially U-shaped base portion 11, between the legs of which a glass (not shown) is arranged to be placed for receiving the expressed juice. The frame is provided with a vertical bore 12 extending downwardly from its upper end. The bore receives a shaft 13 for sliding movement, and is provided on one side thereof with rack teeth 14. A pin 15 mounted in the frame is disposed within a longitudinal recess 16 in the shaft to prevent relative rotative movement between the members as well as to limit upward movement of the shaft. The shaft is driven downwardly and then upwardly by means of a pinion 20 keyed to a stub shaft 21 journalled in an aperture 18 within a bearing 19 removably positioned in the frame.

A bushing 23 is provided with an opening 22 which receives a shaft 21, which is secured to the bushing. The bushing supports an arm 24 carrying a handle 25 at its outer end. This handle is specially shaped, as shown, to cause it to fit more conveniently in the hand of the user and to permit the application of maximum pressure with minimum effort. At the upper end of the shaft a cross-head 30 is secured, and at its opposite end a presser head 31 is mounted. Since it is desirable to remove the presser head for periodic cleaning, it is preferable to provide some suitable arrangement such as a bayonet joint (not shown) between the elements, which may be manipulated by means of a knurled collar 32.

A generally cylindrical bowl 33 is removably supported on a generally circular, forward extension 34 of the upright frame. The forward extension has the same external contour as that of the bowl and extends around and forms a seat for the major portion of the diameter of the bowl. It is provided with diagonally-inclined, terminal portions 35, and between such terminal portions the bowl has a downwardly-extending portion 36. In order to firmly support the bowl against dislodgement from its seat, the inner surface of the upper edge of the semi-circular seat is cut away, as shown at 40 in Fig. 4, thus forming a flange 48. The lower edge of the bowl is similarly cut away, as shown at 42, to receive the flange.

Thus, when it is desired to remove the bowl from its seat, it is merely raised upwardly. There is also provided a slot 37 extending downwardly from the upper end of the frame which receives a headed pin (not shown) carried by the bowl which affords a more firm mounting for the bowl.

The several knives 43 (four being illustrated) are radially disposed around the upper section of the bowl. They are generally triangular in shape and have inwardly and downwardly-inclined cutting edges 44. Their inner terminals 45 are spaced from the axis of the bowl.

It will be noted that presser head 31 has radially-disposed slots 46 arranged to permit the knives to pass therethrough as the head descends. Extending upwardly from the slots on each side thereof are flanges 46' which act as baffles to effectively prevent squirting of juice upwardly through the slots, since drops of the juice, unless they were directed exactly perpendicular upwardly would in most instances contact one or the other of the opposed walls and thus lose their velocity. The cutting operation prepares the fruit for the expressing operation by making four radial cuts in the fruit while preserving the general shape of the same. The knives, by virtue of their downwardly-inclined cutting edges, also act to center the fruit, which is shown at 41, within the bowl prior to the cutting operation. The symmetrical arrangement of the knives, four being shown, provides automatic centering of the fruit in the bowl, irrespective of the size fruit.

The lower wall 49 of the bowl is provided with an inclined surface leading downwardly to a juice outlet 50. When the fruit has been cut by the knives, further downward movement of the presser head moves the fruit onto a hinged tray 53 which has a generally flat, upper surface provided with a plurality of downwardly-inclined channels 54 which lead to a plurality of juice openings 55. The portion of the tray having the openings has a downwardly disposed substantially oval extension 56 on its lower surface which acts as a stop to limit outward pivotal movement of the tray since when its inner arcuate surface contacts the wall of bowl 33 further rotation is prevented. This extension also avoids any dripping of the juice when the tray is in the open position of Fig. 2, since the juice openings 55 remain positioned above the bowl.

The tray is arranged to pivot horizontally out of and into the bowl through an elongated slot 59 in the side wall thereof. The pivotal means for the tray comprise a boss 57 which may be formed integrally with the tray, the boss supporting a pin (not shown) which passes into a hole in a boss 58 on the exterior of the bowl. A handle 61 extends outwardly from the tray, and between the handle and boss 57 there is an upwardly-extending flange 62. This flange forms an effective barrier for any juice that might tend to pass through opening 59 and out of the bowl. An annular seat 64 extends around the lower wall of the bowl and forms a firm seat for the tray. In order to permit complete removal of the tray from the bowl for cleaning purposes, the flange around the tray is partially cut away, as shown at 65. This permits the tray to be moved upwardly until the pivot pin is clear of its bearing in bore 58, and then the tray can be moved horizontally out of the opening 59.

In operation, the tray is moved into the bowl wherein it is seated on an annular flange 64. The whole fruit 41 is then introduced into the upper portion of the bowl and is centered by the inclined, upper edges 44 of the knives. The presser head is now moved downwardly, forcing the fruit through the knives which make four spaced, radially-disposed cuts in the fruit. The handle is so geared that it holds the presser head up when loading, and reaches the most convenient position for both cutting and expressing the juice as it is rotated to send the presser head downwardly. The segments of the cut fruit remain attached to each other, however, so that the carcass can be removed in one piece. The presser head then presses the fruit against the tray with its inclined juice channels. As the juice is pressed out, the upper and lower walls of the carcass approach each other and eventually become flattened while retaining the seeds and most of the pulp. The presser head is then raised, the tray swung outwardly, and the carcass removed. The expressed juice will then pass through openings 55 in the tray, opening 50 in the bowl, and into the glass (not shown).

While one form or embodiment of the invention has been shown and described herein for illustrative purposes, and the construction and arrangement incidental to one specific application thereof has been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What we claim is:

1. In an apparatus for expressing juice from citrus fruit and the like, the combination of a frame, a bowl mounted on the frame and having an opening in its side wall, a tray mounted for movement into and out of the bowl through such opening, the lower walls of the bowl and the tray having juice openings therein and inclined paths leading to such openings, knives mounted radially of the bowl above the tray and spaced from the axis of the bowl, and a presser head arranged for vertical movement into the bowl and having slots to permit the head to pass below the knives.

2. In an apparatus of the character described, the combination of a frame, a bowl having a side wall opening mounted on the frame, a tray mounted for movement into and out of the bowl through such opening, the lower walls of the bowl and the tray having juice openings therein and inclined paths leading to such openings, knives mounted radially of the bowl above the tray and spaced from the axis of the bowl, the upper edges of the knives being inclined downwardly toward such axis, and a presser head arranged for vertical movement into the bowl and having slots to permit the head to pass below the knives.

3. In an apparatus for expressing juice from citrus fruit and the like, the combination of a frame, a bowl removably mounted on the frame and having an elongated, horizontal opening in its side wall, a tray pivotally mounted within such opening for movement into and out of the bowl, an annular seat within the bowl for supporting the tray, the lower walls of the bowl and the tray having juice openings therein and inclined paths leading to such openings, knives mounted radially of the bowl above the tray and spaced from the axis of the bowl, the upper edges of the knives being inclined downwardly toward such axis, and a presser head arranged for vertical movement into the bowl and having slots to permit the head to pass below the knives to allow the fruit cut inwardly by the knives to be compressed between the head and the tray.

ROBERT C. READ.
FRANK J. GREGOR.

REFERENCES CITED

The following references are of record in the file of this patent:

UNITED STATES PATENTS

| Number | Name | Date |
|---|---|---|
| 84,791 | Billings | Dec. 8, 1868 |
| 280,257 | Stein et al. | June 26, 1883 |
| 501,928 | Fairbanks | July 25, 1893 |
| 580,560 | Scoville | Apr. 13, 1897 |
| 587,860 | Redmon | Aug. 10, 1897 |
| 782,406 | Mayhew et al. | Feb. 14, 1905 |
| 783,893 | Ribert | Feb. 28, 1905 |
| 941,001 | Wise | Nov. 23, 1909 |
| 2,177,939 | Johnson | Oct. 31, 1939 |
| 2,404,382 | Klein | July 23, 1946 |